United States Patent
Nakamura

[11] Patent Number: 5,966,923
[45] Date of Patent: Oct. 19, 1999

[54] CHAIN

[75] Inventor: Jiro Nakamura, Ibaraki, Japan

[73] Assignee: Daifuku Co., Ltd., Japan

[21] Appl. No.: 09/251,078

[22] Filed: Feb. 16, 1999

[51] Int. Cl.⁶ .................................................... B21L 9/04
[52] U.S. Cl. ........................... 59/78; 59/84; 474/206; 474/227; 198/851
[58] Field of Search ........................... 59/78, 82, 85, 59/90, 84; 474/206, 207, 227; 198/850, 851

[56] References Cited

U.S. PATENT DOCUMENTS

| | | | |
|---|---|---|---|
| 1,793,065 | 2/1931 | Da Costa | 198/851 |
| 2,298,604 | 10/1942 | Webb | 198/851 |
| 2,487,500 | 11/1949 | Webb | 198/851 |
| 2,860,529 | 11/1958 | Sull | 198/851 |
| 3,742,863 | 7/1973 | Rosenberger, Jr. | 198/851 |
| 4,020,629 | 5/1977 | Wilmot et al. | 59/85 |
| 4,143,512 | 3/1979 | Templin | 59/85 |
| 4,263,779 | 4/1981 | Petershack | 59/8 |

FOREIGN PATENT DOCUMENTS

| | | |
|---|---|---|
| 38-3837 | 3/1938 | Japan . |
| 61-49727 | 4/1986 | Japan . |
| 2-34464 | 2/1990 | Japan . |
| 3-51717 | 5/1991 | Japan . |
| 10045227 | 2/1998 | Japan . |

*Primary Examiner*—David Jones
*Attorney, Agent, or Firm*—D. Peter Hochberg

[57] ABSTRACT

A conventional chain capable of reserving lubricating oil is complex in shape and expensive since each chain plate is formed with countersunk recesses and through-openings. Since the recesses are formed in an overlap region, the chain tends to rattle, producing noise. In the present invention according to which lubricating oil is fed toward a connecting pin, the lubricating oil is transferred to the connecting pin to effect intended lubrication. Part of the lubricating oil thus fed adheres to the recessed surfaces of the recesses and is prevented from immediately flowing down by viscous friction resistance and surface tension in the recessed surfaces. Thus, the oil is held in its adhering state. The lubricating oil gradually flows down to be used for lubrication as the chain moves. Thereby, after the chain has passed by an oil feeder, the connecting pin of the chain stays in such a state that oil is fed continuously for a long time.

4 Claims, 5 Drawing Sheets

CHAIN

FIELD OF THE INVENTION

The present invention relates to a chain that is utilized, for example, for driving a trolley in a trolley conveyor device.

BACKGROUND OF THE INVENTION

As regards this type of chain, there have heretofore been proposed transfer chains, such as one found in Japanese Utility Model Application Laid-open No. 61-49727. More particularly, in a transfer chain having vertically directed connecting pins used for connecting chain plates, the lower chain plate in a chain plate overlap region is formed with a countersunk recess serving as an oil reservoir, said recess being covered by the upper chain plate in the chain plate overlap region, the arrangement being such that oil that passes through a through-hole formed in an intermediate portion of the upper chain plate and collects in the countersunk recess adheres to the surface of the connecting pin passing through the recess and is utilized as lubricating oil.

According to the conventional arrangement described above, however, many chain plates are formed with countersunk recesses and through-holes, presenting problems that they are complex in shape and expensive. In addition, they are liable to rattle, producing noise, due to the formation of the recesses in the chain plate overlap region. Accordingly, an object of the present invention is to provide a chain that is simple in shape and hardly rattles, and yet is capable of feeding lubricating oil for a long time.

Further, it is also an object of the invention to provide a chain that is of a type that can be assembled and disassembled, and yet is capable of being fed with lubricating oil for a long time.

SUMMARY OF THE INVENTION

To achieve the above objects, the chain of the invention is a chain comprising center links in singles and side links in pairs which are alternately connected by connecting pins, characterized in that each connecting pin has heads formed at opposite ends of a shank thereof, said head being cut to form recesses each extending from the outer surface to one of the opposite lateral surfaces of the head.

According to the invention, at a predetermined place, lubricating oil is fed by an oil feeder or the like toward the upper surface of the chain, i.e., toward the connecting pin, whereby the lubricating oil is moved to the connecting pin to effect intended lubrication. Part of the lubricating oil thus fed adheres to the recessed surfaces of the recesses and is prevented from immediately flowing down by viscous friction resistance and surface tension in the recessed surfaces, so that the oil is held in its adhering state. And the lubricating oil gradually flows down to be used for lubrication as the chain moves. Thereby, after the chain has passed by the oil feeder, the connecting pin of the chain stays in such a state that the oil is fed continuously for a long time.

Further, the chain of the invention is characterized in that the recesses are V-shaped. Therefore, part of the lubricating oil fed toward the connecting pin is allowed to adhere to the V-shaped surfaces of the recesses and is prevented from immediately flowing down by the viscous friction resistance and surface tension of the V-shaped surfaces, so that the oil is held in its adhering state.

Also, the chain of the invention is characterized in that the recesses are U-shaped. Therefore, part of the lubricating oil fed toward the connecting pin is allowed to adhere to the U-shaped surfaces of the recesses and is prevented by the viscous friction resistance and surface tension in the U-shaped surfaces from immediately flowing down, so that the oil is held in its adhering state.

Further, the chain of the invention arranged as described above is characterized in that the connecting pin has rectangular heads formed at the opposite ends of the shank thereof, while each center link is formed with elongated openings that allow insertion and movement of said connecting pin and each side link is formed with through-openings and recesses, said through-openings allowing passage of said connecting pin, said recesses being adapted to be engaged with part of the head. Therefore, the chain is arranged such that after the shank of the connecting pin has been passed successively through the through-opening, the elongated opening and the through-opening, it is turned through 90 degrees to allow the heads to engage with the recesses; thus, the center link and the pair of side links can be connected together by the connecting pin and be separated from each other by the reverse operation.

According to the invention, at a predetermined place, lubricating oil is fed by an oil feeder or the like toward the connecting pin, whereby the lubricating oil is moved to the connecting pin to effect the intended lubrication. Part of the lubricating oil thus fed adheres to the recessed surfaces of the recesses and is prevented from immediately flowing down by the viscous friction resistance and surface tension in the recessed surfaces, so that the oil is held in its adhering state. And the lubricating oil gradually flows down to be used for lubrication as the chain moves. Thus, after the chain has passed by the oil feeder, the state of the oil being fed to the connecting pin can continue for a long time. Further, the recesses in the connecting pin can be simply formed by notching, so that the chain can be provided at a low cost. In addition, the link overlap region can be made to hardly rattle, without producing noise.

Further, part of the lubricating oil fed toward the connecting pin is allowed to adhere to the V-shaped surfaces of the recesses, and the viscous friction resistance and surface tension in the V-shaped surfaces prevent the oil from immediately flowing down, so that the adhering state of the oil can be maintained. Likewise, part of the lubricating oil fed toward the connecting pin is allowed to adhere to the U-shaped surfaces of the recesses, and the viscous friction resistance and surface tension in the U-shaped surfaces prevent the oil from immediately flowing down, so that the adhering state of the oil can be maintained.

Furthermore, the chain is arranged such that after the shank of the connecting pin has been passed successively through the through-opening, the elongated opening and the through-opening, the heads are caused to engage with the recesses; thus, the center link and the pair of side links can be connected together by the connecting pin and separated from each other by the reverse operation. In this way, the chain is of the type that can be assembled and disassembled and yet is capable of being fed with the lubricating oil for a long time.

EMBODIMENTS OF THE INVENTION

Figure 1:
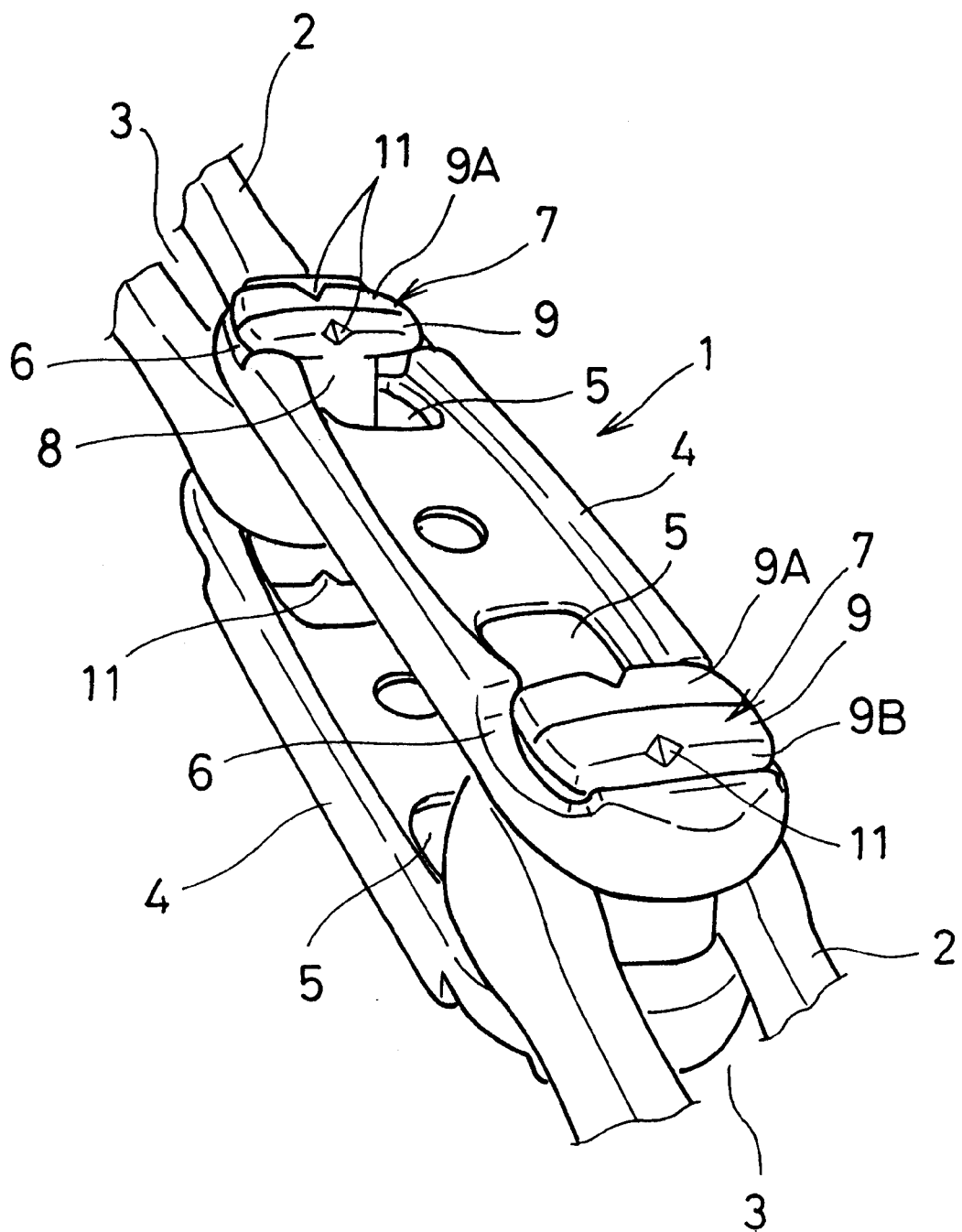
FIG. 1 is a perspective view of a principal portion of a chain according to an embodiment of the invention.
Figure 2:
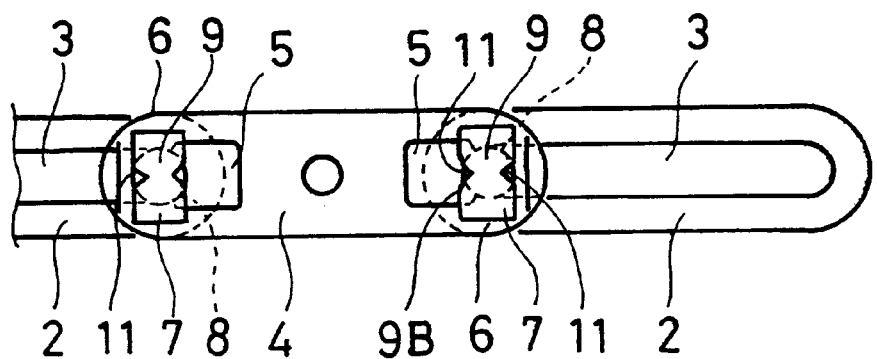
FIG. 2 is a plan view of the principal portion of said chain.
Figure 3:
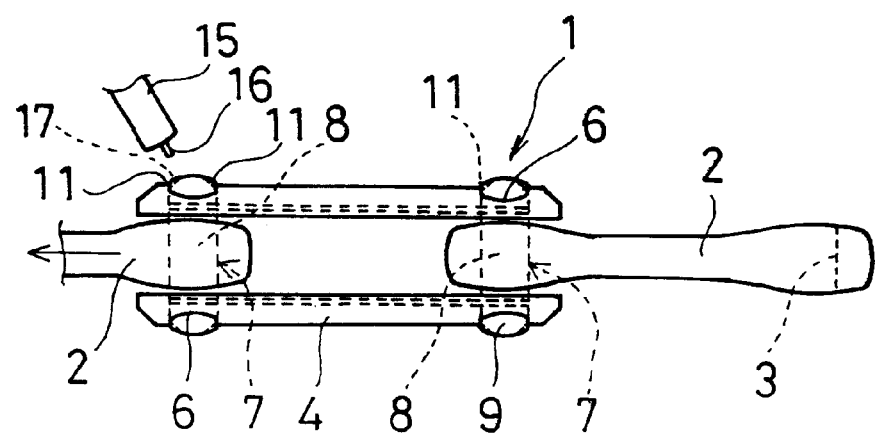
FIG. 3 is a side view of the principal portion of said chain.
Figure 4:
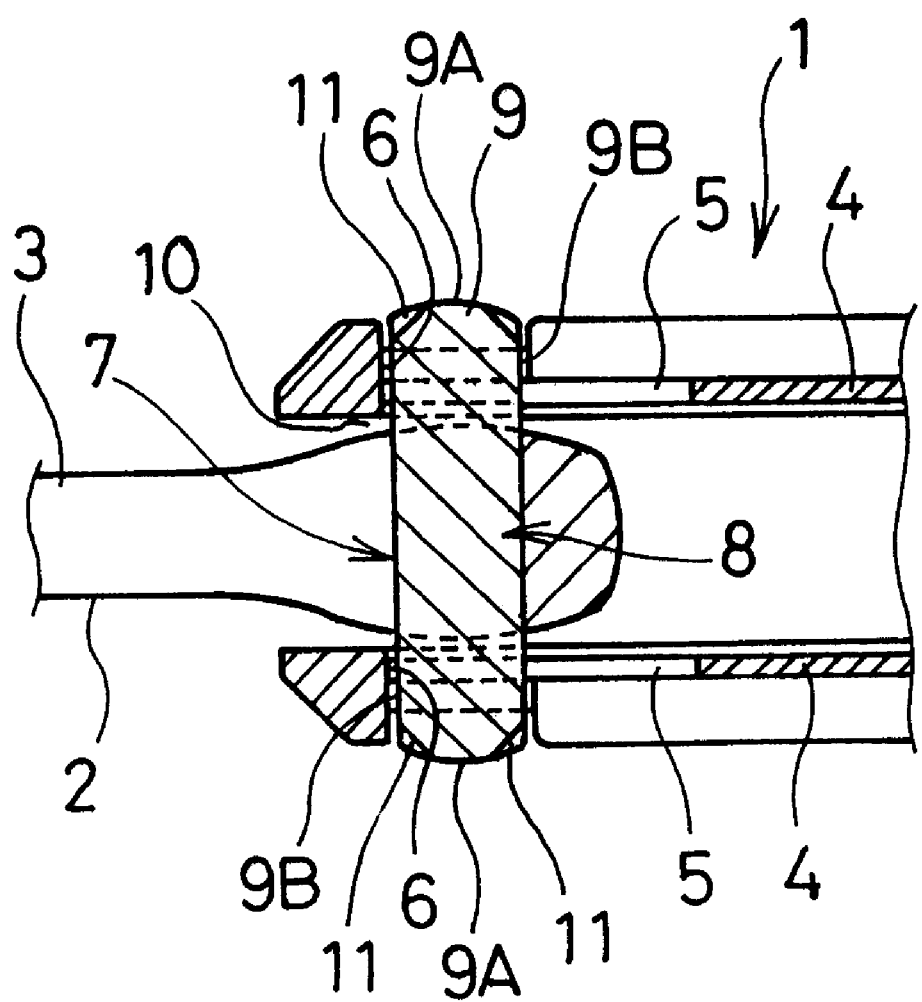
FIG. 4 is a longitudinal-sectional side view of the principal portion of said chain.

Embodiments of the invention will now be described with reference to FIGS. 1 through 4. A chain 1 comprises center links 2 in singles and side links 4 in pairs that are alternately connected by connecting pins 7. Said center link 2 is formed with an elongated opening 3 extending lengthwise that allows insertion and movement of the connecting pin 7. Further, said connecting pin 7 is formed with rectangular heads 9 at opposite ends of the shank 8 thereof. The length of the shorter sides of each head 9 is equal to the diameter of the shank 8, so that when the longer sides of the head 9 are positioned in the lengthwise direction of the chain 1, this connecting pin 7 can be inserted into and extracted from the elongated opening 3 in the center link 2.

Formed adjacent to the lengthwise opposite ends of said side link 4 are rectangular through-openings 5 that allow passage of the heads 9 of the connecting pin 7 when the longer sides of the heads 9 are positioned in the lengthwise direction of the chain 1. Further, the opposite outer sides of each through-opening 5 are formed with recesses 6 adapted to be engaged from outside with such portions of the head 9 that hang out of the shank 8 when the shorter sides of the head 9 are positioned in the lengthwise direction of the chain 1. During the connecting operation, a clearance 10 appears between the center link 2 and the side links 4. The length of the shank 8 and others are determined such that an operation to fill the clearance 10 releases the head from the recess 6. In the two heads 9 (or at least the head 9 that is in the upper position), V-shaped recesses 11 are formed in the lengthwise-directional middle portions of a pair of edges forming the longer-side edges of the head, each V-shaped recess 11 extending from the upper or lower area (outer surface) 9A to the front or rear lateral area (lateral surface) 9B. Further, the V-shaped recesses 11 are inclined linearly or of a L shape as seen in a side view.

The thus-constructed chain 1 is arranged such that after the shank 8 of the connecting pin 7 has been passed through the through-opening 5, elongated openings 3 and through-opening 5, the connecting pin 7 is turned through 90 degrees to bring the head 9 into engagement with the recesses 6; thus, the center link 2 and the side links 4 can be connected by the connecting pin 7, and the links 2 and 4 can be separated by the reverse operation. And in a predetermined place in the path of travel of the chain 1, lubricating oil 17 is fed from a nozzle 16 of an oil feeder 15 toward the upper surface of the chain 1, i.e., toward the connecting pin 7, whereby the lubricating oil 17 is moved to the connecting pin 7. In this case, part of the lubricating oil 17 fed toward the connecting pin 7 adheres to the V-shaped surfaces of the recesses 11. And viscous friction resistance and surface tension of the V-shaped surfaces of the recesses 11 prevent the lubricating oil from immediately flowing down and retain it in its adhering state. And the lubricating oil 17 in this adhering state gradually flows down to be used for lubrication as the chain 1 moves. Thus, after the chain 1 has passed by the oil feeder 15, the state of oil being fed to the connecting pin 7 can continue for a long time.

Figure 5:
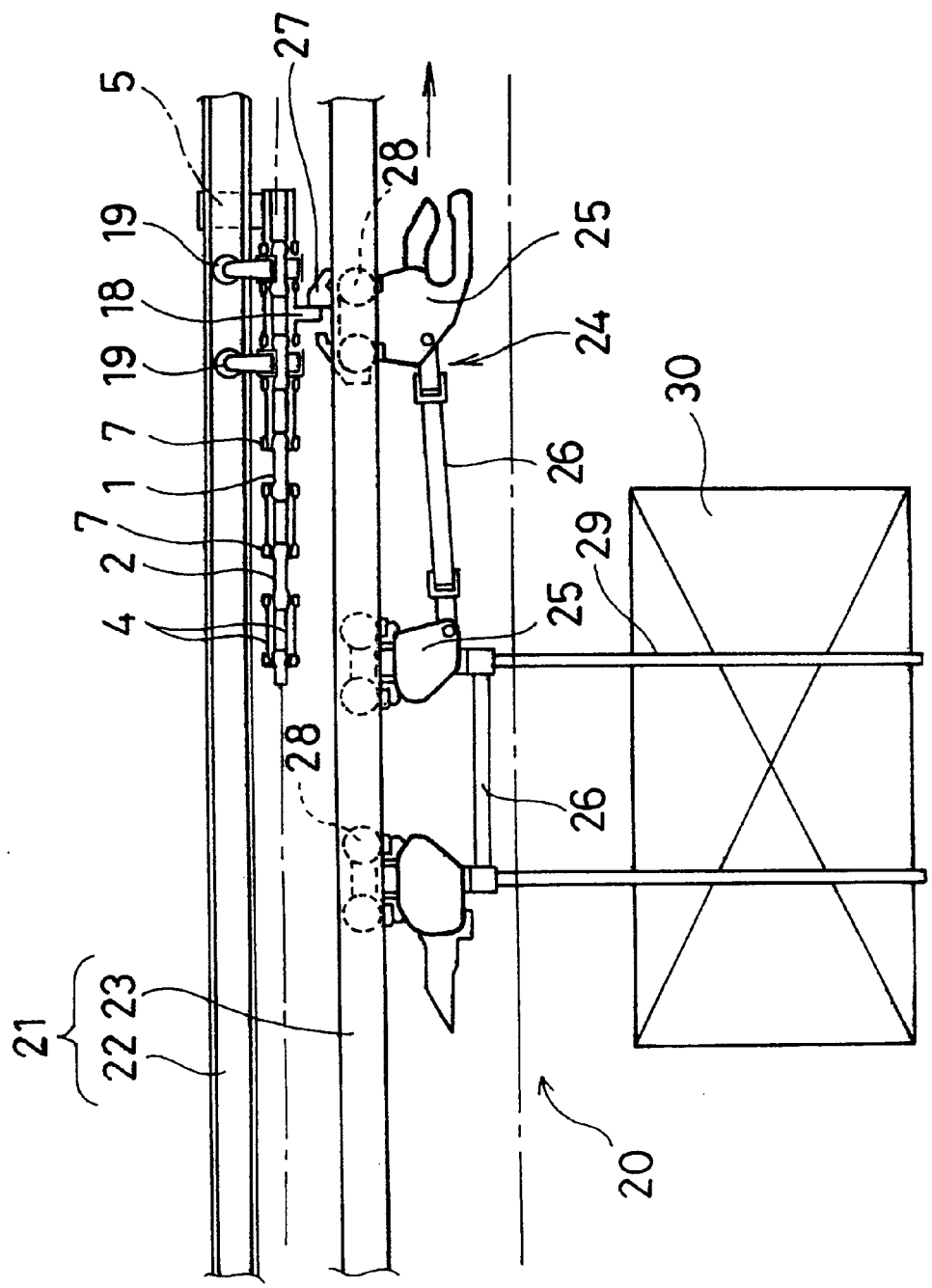
FIG. 5 is a side view of a suspended transfer facility incorporating the chain according to the embodiment of the invention.

An embodiment of the invention applied to a suspended transfer facility for transferring loads in a fixed path along a ceiling will now be described with reference to FIG. 5. The suspended transfer facility 20 comprises a rail system 21 and a traveling unit 24 supported and guided by said rail system 21. The rail system 21 comprises a driver rail 22 made of I-shaped material disposed in an upper position and a pair of traveling unit rails 23 made of channel-shaped material disposed in a lower position with their open sides opposed to each other. In the thus-constructed rail system 21, the traveling unit rails 23 support and guide the traveling unit 24, while the driver rail 22 supports and guides a driving chain 1 that imparts a moving force to the traveling unit 24. That is, the traveling unit 24 in the form of a trolley comprises a plurality of trolleys 25, connecting frames 26 each connecting two adjacent trolleys 25, and a motion receiver 27 attached to a given trolley 25, each trolley 25 being supported and guided by said traveling unit rail 23 through a plurality of wheels 28. In addition, each connecting frame 26 has attached thereto supports 29 for a load 30. The chain 1 supported and guided by the driver rail 22 and imparting a moving force to said traveling unit 24 is provided with a plurality of motion transmitters 18 spaced at a predetermined pitch. Rollers 19 or the like supported and guided by the driver rail 22 are disposed on opposite sides of and adjacent to such motion transmitter 18. In addition, it is arranged that the motion transmitter 18 and the motion receiver 27 engage or disengage each other when either of them actuates.

According to such arrangement, the travel of the traveling unit 24 during operation is effected in its passage by engaging the motion transmitter 18 and the motion receiver 27 with each other. During such operation, the lubricating oil 17 is fed from the nozzle 16 of the oil feeder 15; thus, the oil is transferred to oiling pins 7.

Figure 6:
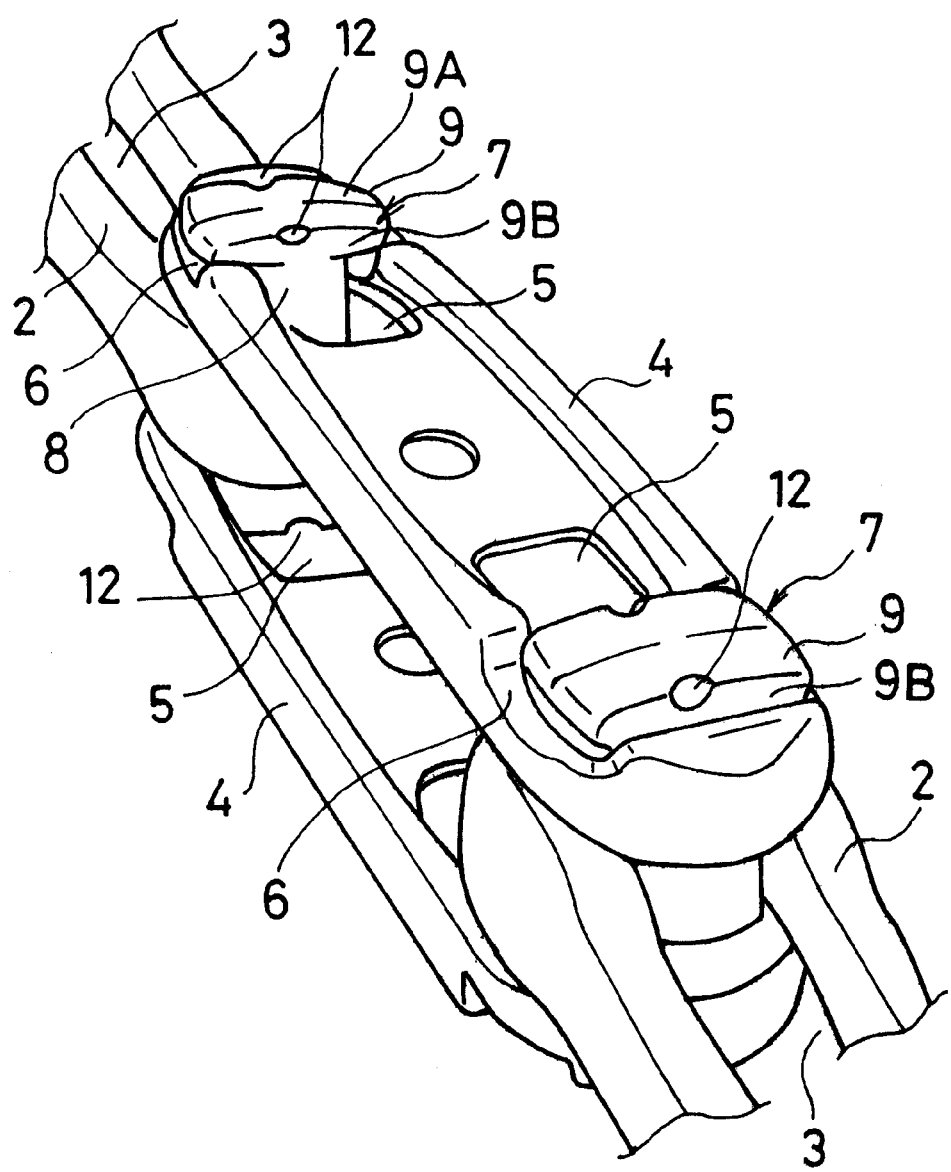
FIG. 6 is a perspective view of a principal portion of a chain according to another embodiment of the invention.

Another embodiment of the invention will now be described with reference to FIG. 6. In the two heads 9, U-shaped recesses 12 are formed in the lengthwise-directional middle portions of the pair of edges forming the longer-side edges of the head, each U-shaped recess 11 extending from the upper or lower area (outer surface) 9A to the front or rear lateral area (lateral surface) 9B. According to this different embodiment, part of the lubricating oil 17 fed toward the connecting pin 7 adheres to the U-shaped surfaces of the recesses 12. The viscous friction resistance and surface tension of the U-shaped surfaces of the recesses 12 prevent the lubricating oil from immediately flowing down and retain it in its adhering state. And the lubricating oil 17 in this adhering state gradually flows down to be used for lubrication as the chain 1 moves. Thus, after the chain 1 has passed by the oil feeder 15, the state of oil being fed to the connecting pin 7 can continue for a long time.

In the embodiments described above, V-shaped recesses 11 or U-shaped recesses 12 have been shown; however, they may be W-shaped recesses or dove-tailed recesses. While the chain 1 of the type that can be assembled and disassembled has been shown wherein the connecting pin 7 is formed with rectangular heads 9 at the opposite ends of the shank 8 thereof, the chain 1 may be of the type using a connecting pin in the form of a rivet so that the chain cannot be easily disassembled. Further, while the two heads 9 are formed with V-shaped recesses 11 or U-shaped recesses 12, such recesses 11 or 12 may be formed only in that head 9 which is disposed in an upper position in the oiling position.

What is claimed is:

1. A chain comprising center links, pairs of side links and connecting pins that connect the center links and the pair of side links alternately, characterized in that each connecting pin has heads at opposite ends of a shank thereof, said head being formed with recesses, one of the recesses extending from the outer surface to one lateral surface of the head and the other extending from the outer surface to the other lateral surface of the head.

2. A chain as set forth in claim 1 wherein said recesses are V-shaped.

3. A chain as set forth in claim 1 wherein said recesses are U-shaped.

4. A chain as set forth in claim 1 wherein the connecting pin has rectangular heads at the opposite ends of the shank thereof, the center link is formed with elongated openings that allow insertion and passage of the connecting pin, and the side link is formed with through-openings and recesses, said through-openings allowing passage of the connecting pin, said recesses being adapted to be engaged with part of the head of the connecting pin.

* * * * *